United States Patent
Al Masri et al.

(10) Patent No.: US 11,606,738 B2
(45) Date of Patent: *Mar. 14, 2023

(54) ROUTING METHOD AND DEVICE OF MOBILE AD-HOC NETWORKS

(71) Applicant: Mage Networks Inc., Calgary (CA)

(72) Inventors: Mohamed Ammar Al Masri, Calgary (CA); Sayed-Amr El-Hamamsy, Calgary (CA); Ahmed N. Zaki, Calgary (CA)

(73) Assignee: MAGE NETWORKS INC., Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/510,557

(22) Filed: Oct. 26, 2021

(65) Prior Publication Data

US 2022/0046514 A1 Feb. 10, 2022

Related U.S. Application Data

(63) Continuation of application No. 16/777,388, filed on Jan. 30, 2020, now Pat. No. 11,184,832.

(51) Int. Cl.
*H04W 40/24* (2009.01)
*H04W 84/18* (2009.01)

(52) U.S. Cl.
CPC ....... *H04W 40/248* (2013.01); *H04W 40/244* (2013.01); *H04W 84/18* (2013.01)

(58) Field of Classification Search
CPC ... H04W 72/02; H04W 76/025; H04W 48/10; H04W 24/08; H04W 76/064; H04W 72/04; H04W 84/22; H04W 40/20; H04W 40/22; H04W 76/15; H04W 88/18; H04W 76/34; H04W 40/30; H04W 40/246; H04B 17/373; H04L 41/0213; H04L 14/0268; H04L 41/5025; H04L 41/0654; H04L 45/28; H04L 49/557; H04L 69/40; H04L 47/12; H04J 2203/006
See application file for complete search history.

(56) References Cited

U.S. PATENT DOCUMENTS

| | | | |
|---|---|---|---|
| 8,098,578 B1* | 1/2012 | Shah | H04L 41/0893 370/230 |
| 2009/0232026 A1* | 9/2009 | Lu | H04W 40/12 370/254 |
| 2010/0260146 A1* | 10/2010 | Lu | H04L 12/4633 455/432.1 |

(Continued)

*Primary Examiner* — Jung Liu
(74) *Attorney, Agent, or Firm* — Dickinson Wright PLLC; Andrew D. Dorisio

(57) ABSTRACT

A network construction method, a routing method and device of mobile ad-hoc networks are provided. The mobile ad-hoc network includes a plurality of nodes, each node communicating with its neighbors via communication links. The routing method comprises the following steps: each node identifying a link quality with each of its neighbors by providing marks based on a hysteresis-based link quality marking mechanism; each node identifying a link operationality with each of its neighbors by evaluating a score calculated from the marks; and each node reconstructing routes with its neighbors by filtering route construction messages related to the link operationality of the neighbors.

32 Claims, 14 Drawing Sheets

(56) References Cited

U.S. PATENT DOCUMENTS

| | | | |
|---|---|---|---|
| 2011/0235550 A1* | 9/2011 | Adams | H04W 40/30 |
| | | | 370/255 |
| 2015/0215832 A1* | 7/2015 | Fitzpatrick | H04W 48/14 |
| | | | 455/426.1 |
| 2017/0208540 A1* | 7/2017 | Egner | H04W 64/003 |
| 2017/0257129 A1* | 9/2017 | Egner | H04W 52/0261 |
| 2017/0272972 A1* | 9/2017 | Egner | H04L 47/2441 |
| 2017/0311143 A1* | 10/2017 | Yamaura | H04W 84/12 |
| 2017/0346708 A1* | 11/2017 | Patil | H04L 43/04 |
| 2018/0152848 A1* | 5/2018 | Egner | H04W 76/18 |
| 2018/0167948 A1* | 6/2018 | Egner | H04W 76/16 |
| 2018/0332563 A1* | 11/2018 | Sihlbom | H04W 48/10 |
| 2020/0008120 A1* | 1/2020 | Beck | H04W 36/30 |
| 2020/0259737 A1* | 8/2020 | Koshy | H04W 28/0883 |
| 2020/0296451 A1* | 9/2020 | Hassler | H04N 21/442 |
| 2020/0374960 A1* | 11/2020 | Deenoo | H04W 76/19 |

* cited by examiner

Sender A's Hysteresis Thresholds: $TL_A$, $TH_A$
Sender A's Number of Transmission Retries: $R_A$
Sender A's Number of Dropped Packets: $N_A$
Sender A's Advertisement Period: $T_A$
Sender A's IP Address: AA.AA.AA.AA
Sender A's Neighbors' IP Address: 1) XX.XX.XX.XX
                                               2) YY.YY.YY.YY
Sender A's Neighbors' Link Quality History: 1) $[x_1\ x_2\ ..\ x_{j-1}]$
                                                       2) $[y_1\ y_2\ ..\ y_{j-1}]$

FIG. 15

ROUTING METHOD AND DEVICE OF MOBILE AD-HOC NETWORKS

This application is a continuation of U.S. application Ser. No. 16/777,388 filed on Jan. 30, 2020, the disclosure of which is incorporated herein by reference.

FIELD

This invention relates to the field of wireless communication networks, and more specifically to Mobile Ad-hoc NETworks (MANETs), and related routing methods and devices.

BACKGROUND

Traditionally, wireless networks operate in one of two topologies: infrastructure or ad-hoc mode. In the infrastructure topology, all communications among wireless nodes must go through a central Point-of-Attachment (PoA) which typically has higher processing and transmission capabilities but is much more expensive than the rest of the wireless nodes in this topology. In the ad-hoc topology, wireless nodes directly communicate with each other without the need for a central PoA. While the setup of ad-hoc networks is simpler, faster, and cheaper than infrastructure-based networks, the handover management is more complex.

In infrastructure-based networks, handing off a session between two PoAs is handled in three ways: (1) Network-Controlled Handoff: In a network-controlled handoff procedure, the network makes a handoff decision based on the signal measurements of the mobile node at a number of PoAs; (2) Mobile-Assisted Handoff: In a mobile-assisted handoff procedure, the mobile node takes measurements and forwards these measurements to the network which, in turn, makes the decision; and (3) Mobile-Controlled Handoff: In mobile-controlled handoff procedure, each mobile node is completely in control of the handoff process.

In traditional ad-hoc networks, on the other hand, only the mobile-controlled handoff is used due to the lack of centralized management.

Typically, a handoff is triggered when specific link-level measurements meet certain criteria. For example, the Received Signal Strength Indicator (RSSI), Bit Error Rate (BER), and Packet Error Rate (PER) are link-level measurements used to trigger a handoff. FIG. 1 depicts a hysteresis-based handoff criterion between two PoAs. In this example handoff scheme, the handoff is executed when the RSSI of the old PoA is lower than a predefined threshold, H, and the RSSI of the new PoA is higher than that of the old one by a predefined margin, h.

Due to the centralized management in infrastructure-based networks, changing the PoA is sufficient to reconstruct the packet route. The old PoA and the new PoA communicate with each other to re-route packets through the new PoA thereby avoiding the unidirectional link problem. The unidirectional link problem is when transmission is successful in one direction but not in the other. However, due to the distributed management in ad-hoc networks, a link that becomes unidirectional causes a failure to reconstruct the broken routes.

Conventional ad-hoc networks do not describe specific requirements for the deployment of the fixed portion of the network. Poorly constructed networks will impact the performance of any hand-off algorithm. A poorly constructed network may include areas of coverage gaps or insufficient coverage overlap. Most ad-hoc routing algorithms assume that the wireless links among the network nodes are bidirectional. However, this assumption is not always true, whereby some links could be unidirectional due to differences in transmission power and receiver sensitivity of the different nodes. Due to node mobility, bidirectional links may turn into unidirectional ones for a period of time before disconnection. The presence of unidirectional links severely affects the performance of ad-hoc routing protocols and prevents the ability to reconstruct routes in a timely manner. Although some protocols facilitate transmitting packets over asymmetric routes to overcome the unidirectional link problem, these solutions require modifying the Media Access Control (MAC) layer, causing increased complexity and cost.

Some ad-hoc networks use link quality metric (e.g., RSSI, BER, SNR and SNIR) to determine whether the link to a given node can be part of a route or not. This link quality metric ensures that the quality of the links is high and prevents unnecessary route changes. The list of nodes with acceptable links is known as the neighbors list. Sending information about the neighbors' list is called a neighbor advertisement. To proactively identify link directionality, and therefore solve the unidirectional link problem, a neighbor advertisement technique can be used where each node periodically broadcasts a hello message containing its own neighbors' list. When two adjacent nodes find their own address in each other's neighbor advertisement, they identify the link between them as bidirectional. If one node does not hear its own address in its neighbor's neighbor advertisement, it identifies that link as unidirectional. However, relying only on periodic neighbor advertisements to identify link directionality significantly increases the time required to detect changes in link-status, thereby increasing the route reconstruction time.

Other methods have also been developed with the intent to solve the unidirectional link problem. For example, in table-driven routing protocols, such as the Destination Sequenced Distance Vector (DSDV) routing protocol discussed in the book "Ad Hoc Networking" by Perkins, Charles E. Vol. 1. Published by Addison-Wesley in 2001, herein explicitly incorporated by reference in its entirety, link directionality is identified by periodically exchanging the routing tables among the various nodes and asymmetric routes are constructed to overcome the unidirectional link problems. However, the exchange of the routing table substantially increases the network overhead and reduces the network capacity. Besides affecting the scalability of the solution, exchanging routing tables to reconstruct failed routes significantly increases the route reconstruction time, thereby severely deteriorating the Quality of Service (QoS) of ongoing sessions, especially sessions requiring stringent real-time communications such as VoIP or video calls.

In on-demand routing protocols, such as the Dynamic Source Routing (DSR) discussed in "The dynamic source routing protocol (DSR) for mobile ad hoc networks" by Johnson, David, Yin-chun Hu, and David Maltz, IPv4. No. RFC 4728. 2007, and discussed in "Ad hoc on-demand distance vector (AODV) routing" by Perkins, Charles, Elizabeth Belding-Royer, and Samir Das, No. RFC 3561. 2003, herein both explicitly incorporated by reference in their entireties, the directionality of links is identified at route construction time by using link-level acknowledgements of route construction messages. The absence of these link-level acknowledgements means that one node does not hear the other node (e.g., the link between them is unidirectional).

In DSR, the recipient of a Route Reply (RREP) is required to acknowledge this reception by sending back a RREP acknowledgement (RREP-Ack). When the RREP sender does not receive a RREP-Ack, the RREP sender broadcasts the RREP so as to construct an alternative reverse route. Relying on link-level acknowledgement (Acks) for the route construction messages increases the network overhead and increases the route reconstruction time, decreasing the network capacity, and degrading the supported QoS. In addition, forwarding unicast packets over unidirectional reverse links requires making some changes to the MAC layer functionality such that the MAC layer accepts indirect Acks.

In AoDV, the recipient of a RREP is optionally required to send back a RREP-Ack. If the RREP sender node does not receive a RREP-Ack, the RREP sender puts that recipient node in a blacklist, ignoring any future Route Requests (RREQs) from the RREP recipient for a predefined time. Besides decreasing the network capacity, relying on link-level acknowledgements for the route construction messages to detect changes in link status significantly increases the route reconstruction time and deteriorates the supported QoS.

In "Fast and accurate link discovery integrated with reliable multicast" by Lertpratchya, Daniel, Douglas M. Blough, and George F. Riley, in 802.11. Georgia Institute of Technology, published in 2013, herein explicitly incorporated by reference in its entirety, a reliable multicasting technique for both neighbor discovery and unidirectional link detection was proposed. Although the proposed technique efficiently identifies the link directionality and promptly detects any change in the link status (e.g., directionality), the technique requires modifying the MAC layer functionality. In addition, the technique significantly increases the network overhead as all nodes are required to acknowledge the reception of each multicast message thereby affecting the scalability of this solution.

SUMMARY

Therefore, the need to create a scalable well-constructed broadband Mobile Ad-hoc NETwork (MANET) that provides seamless mobility over a large coverage area may be addressed herein.

The MANET may be constructed to avoids the pitfalls of a poorly constructed network.

The MANET may be able to reconstruct routes fast enough to meet the criteria of demanding applications such as Voice over IP (VOIP) and real-time video.

Any and all aspects as described herein, individually or in any combination consistent within the understanding of one of skill in the art upon reviewing the disclosure herein.

According to an aspect, a routing method of a mobile ad-hoc network may include a plurality of nodes, each node communicating with at least one neighbor via at least one communication link. The method may comprise: each node transmitting an advertisement; each node identifying a link quality with each of the at least one neighbor providing at least one mark based on a link quality metric; each node identifying a link operationality with each of the at least one neighbor by evaluating a score calculated from the at least one mark; and each node reconstructing at least one route with the at least one neighbor by filtering at least one route construction message related to the link operationality of the at least one neighbor. The link quality metric may be hysteresis-based.

The step of identifying the link quality may compare the link quality metric received from the advertisement of the at least one neighbor with a high threshold and a low threshold. The link quality metric may comprise: marking the link quality as high when the link quality metric exceeds the high threshold; marking the link quality as low when the link quality metric falls below the low threshold; marking the link quality as high when the link quality metric falls below the high threshold, and before the link quality metric falls below the low threshold; marking the link quality as low when the link quality metric rises above the low threshold, and before the link quality metric exceeds the high threshold; and marking the link quality as low if a timeout timer for receiving the advertisement expires before receiving a new advertisement from the at least one neighbor.

The link quality metric may be selected from at least one of: a received signal strength indicator (RSSI), a Bit Error Rate (BER), a Signal to Noise Ratio (SNR), a Signal to Noise and Interference Ratio (SNIR), and any combination thereof.

The low threshold may be selected to be higher than a sensitivity of a recipient node.

The step of identifying link operationality may compare the score with a score-operational (SOP) criterion and with a Score-Non-Operational (SNOP) criterion. The step of identifying link operationality may identify a link-from-neighbor operationality and a link-to-neighbor operationality. The step of identifying the link-from-neighbor operationality may comprise: marking the link-from-neighbor as directionally Operational (OP) when the score meets the SOP criterion; marking the link-from-neighbor as directionally Non-Operational (NOP) when the score meets the SNOP criterion; and keeping the link-from-neighbor as a previous status when the score does not meet the SOP criterion and the SNOP criterion. The step of identifying the link-to-neighbor operationality may comprise: marking the link-to-neighbor as directionally NOP when each node does not find each node's own IP address in the advertisement; marking the link-to-neighbor as Going-Non-Operational (GNOP) when the score to the at least one neighbor meets the SNOP criterion when each node finds each node's own IP address in the advertisement; and marking the link-to-neighbor as directionally OP when the score to the at least one neighbor does not meet the SNOP criterion when each node finds each node's own IP address in the advertisement. The step of identifying link operationality may determine the link-from-neighbor operationality and the link-to-neighbor operationality under data packet transmission failure.

The score to the at least one neighbor may be calculated based on the link quality metric of an advertised last j marks.

A link-with-neighbor may be marked as bidirectionally OP when both link-from-neighbor and link-to-neighbor meet the OP criterion.

The routing method may comprise: broadcasting a Route Failure Message (RFM) when a link-with-neighbor is marked as NOP.

The step of determining the link-from-neighbor operationality and the link-to-neighbor operationality under data packet transmission failure may comprise: increasing a packet retransmission counter by 1 when a data packet transmission has failed; increasing a dropped packet counter by 1 when the data packet retransmission counter exceeds a predetermined number of retransmission tries, R; and marking both the link-to-neighbor and the link-from-neighbor as NOP when the dropped packet counter exceeds a predetermined number of dropped packets, N.

The routing method may retransmit data packet when the data packet retransmission counter is below the predetermined number of retransmission tries, R.

The routing method may reset the packet retransmission counter, and retransmitting data packet when the dropped packet counter is below the predetermined number of dropped packets, N.

The step of filtering route construction messages may respond to a Seek Route Message (SRM) from the at least one neighbor and responding to the RFM from the at least one neighbor.

The responding to SRM may comprise: discarding the received SRM when each node receives an SRM over a NOP link-with-neighbor; and discarding the received SRM if the link-to-neighbor is marked as GNOP when each node receives an SRM over an OP link-with-neighbor.

The responding to the RFM may discard the received RFM when each node receives the RFM over the NOP link-with-neighbor. The responding to the RFM may comprise: when each node receives the RFM over an OP link-with-neighbor, marking the link-to-neighbor as NOP if the RFM has each node's own IP address among a list of non-reachable destinations; and invalidating the route using that link.

According to another aspect, a mobile device may comprise a non-transitory computer readable medium storing instructions to cause the mobile device to execute the method of any of claims 1-21.

According to another aspect, a mobile ad-hoc network comprise a plurality of nodes, each node communicating with the at least one neighbor according to the routing method of any one of claims 1-21.

According to yet another aspect, there is provided a mobile ad-hoc network comprising: a plurality of point of attachment (PoA) forming a coverage area, each PoA configured to provide a communication link for a mobile node; each PoA identifying a link quality metric for the communication link with the mobile node; the plurality of PoA located such that: when the mobile node is within the coverage area, the mobile node has at least one operational link with at least one PoA of the plurality of PoA; when the mobile node moves within the area of coverage, the at least one operational link is degrading and the communication link with at least one other PoA is improving; and when the mobile node has only one operational link, a travel time for the mobile node to travel between the PoA with the operational link to the at least one other PoA is less than a time for the mobile node to mark the operational link as non-operational and select the communication link as operational.

The link quality metric may be hysteresis-based.

Each PoA may compare the link quality metric received from an advertisement with a high threshold and a low threshold. The link quality metric may comprise: marking a link quality as high when the link quality metric exceeds the high threshold: marking the link quality as low when the link quality metric falls below the low threshold; marking the link quality as high when the link quality metric falls below the high threshold, and before the link quality metric falls below the low threshold; marking the link quality as low when the link quality metric rises above the low threshold, and before the link quality metric exceeds the high threshold: and marking the link quality as low if a timeout timer for receiving the advertisement expires before receiving a new advertisement.

The link quality metric may be selected from at least one of: a received signal strength indicator (RSSI), a Bit Error Rate (BER), a Signal to Noise Ratio (SNR), a Signal to Noise and Interference Ratio (SNIR), and any combination thereof. The low threshold may be selected to be higher than a sensitivity of the mobile node.

The at least one operational link may be identified by: comparing a score with a score-operational (SOP) criterion and with a Score-Non-Operational (SNOP) criterion. The at least one operational link may be identified by: identifying a link-from-neighbor operationality and a link-to-neighbor operationality.

The link-from-neighbor operationality may comprise: marking the link-from-neighbor as directionally Operational (OP) when the score meets the SOP criterion; marking the link-from-neighbor as directionally Non-Operational (NOP) when the score meets the SNOP criterion; and keeping the link-from-neighbor as a previous status when the score does not meet the SOP criterion and the SNOP criterion.

The link-to-neighbor operationality may comprise: marking the link-to-neighbor as directionally NOP when each PoA does not find each PoA's own IP address in the advertisement; marking the link-to-neighbor as Going-Non-Operational (GNOP) when the score to the at least one neighbor meets the SNOP criterion when each PoA finds each PoA's own IP address in the advertisement; and marking the link-to-neighbor as directionally OP when the score to the at least one neighbor does not meet the SNOP criterion when each PoA finds each PoA's own IP address in the advertisement.

The routing method may assure that link performance meets the broadband requirement during the transition time between the signal being lower than the break threshold and the actual decision of reconstructing the route.

An aspect described herein may solve the unidirectional link problem that arises due to nodes' movement and asymmetric transmission and reception conditions so as to promptly reconstruct broken routes. The unidirectional link problem may be prevented to successfully reconstruct broken routes. Another aspect is accommodating sudden changes due to node movement or any other factors in link status so that these sudden changes may be detected quickly and broken routes may be promptly reconstructed. An aspect described herein may have a rapid hand-off occurring in three main conditions: (1) in normal conditions where the link quality measure is changing gradually and in a bi-directional manner: (2) in a situation where the change is gradual but one direction breaks much earlier than the other direction; and/or (3) when an abrupt change in signal quality such as occurs when for instance a vehicle turns into another street losing connection suddenly with a connected node, and a new route to a new node has to be reconstructed.

The routing method may adapt to different QoS requirements and may have different movement speeds. The routing method may assure the scalability of the seamless mobility solution by reducing the signal overhead needed for route reconstruction and may adopt a distributed route reconstruction approach whereby any node in the network may make the route reconstruction decision.

DESCRIPTION OF THE DRAWINGS

While the invention is claimed in the concluding portions hereof, example embodiments are provided in the accompanying detailed description which may be best understood in conjunction with the accompanying diagrams:

FIG. 15 is an example of an advertisement message broadcasted by a node.

DETAILED DESCRIPTION

MANETs may comprise a fixed set of nodes acting as a network backhaul through which the mobile nodes travel. The fixed portion of the MANET may be constructed in such a way that the network fulfills the following conditions: (1) the mobile node has at least one Operational link at all times. The Operational link may be a link which meets a link quality criterion that ensures data can be transmitted and received by both devices forming that link. (2) Whenever the link quality between a mobile node and a particular PoA is degrading, at least one link is improving with another PoA. (3) In cases where the mobile node has only one operational link, the distance between fixed PoAs should ensure that, at a speed of travel, a time for the mobile node to mark an improving link as operational is less than the time the mobile node takes to mark the degrading link as non-operational. As the network is not infinite in scale, these three conditions may not be met at edges of the network, such as the mobile node is leaving the area of coverage, or alternatively the mobile node is entering the area of coverage. In the cases of the mobile node leaving a network coverage area or approaching the coverage area, no handoff occurs.

Figure 3A:
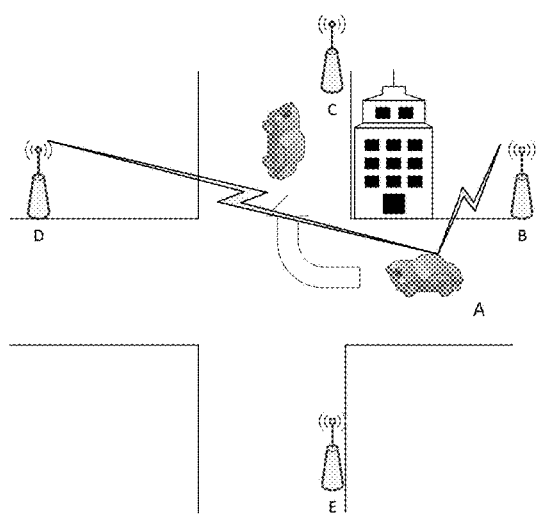
FIGS. 3(a)-3(b) illustrate a poorly and well-constructed MANET diagrams.
Figure 3B:
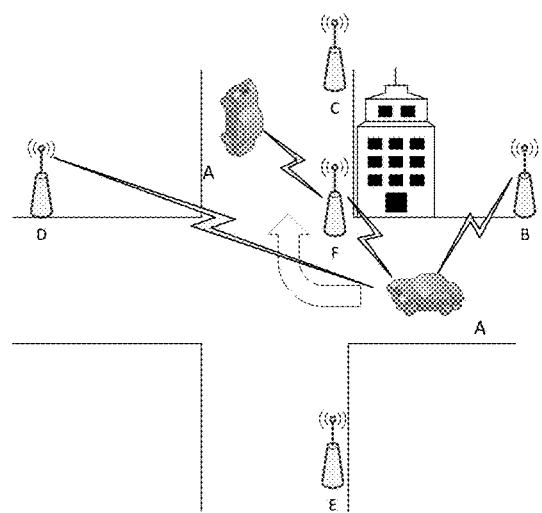

FIG. 3 (a) shows an example of a poorly constructed network; whereas, FIG. 3 (b) shows an example of a well-constructed network. In FIG. 3 (a), the mobile node A maintains connection to the network as long as the mobile node A continues to travel in the B-D direction. The mobile node A has two connections with B and D. The connection to PoA D is improving and the connection to the PoA B is degrading. The mobile node A marks the connection to PoA D as operational before marking the connection to PoA B as non-operational. Because of shadowing, the mobile node A has not established connection with either PoA E or PoA C. When the mobile node A makes a turn into the street in an E-C direction, the mobile node A disconnects with both PoA B and PoA D (e.g. the links become suddenly non-operational) before the mobile node A can establish a connection with PoA E or PoA C (e.g. the links become operational). Re-establishing a route may significantly disrupt any ongoing data traffic. In FIG. 3 (b), a PoA F has been placed at an intersection outside of the shadowing. This location enables the mobile node A to have three connections (with PoAs B, D, and F). When the mobile node A makes a turn, the connection with PoA F stays operational thus maintaining the ongoing connection to the network. The third condition as previously described ensures that the link with PoA C becomes operational before the link with PoA F becomes non-operational. The handoff may be seamless and the data traffic may not be disrupted.

To support seamless mobility in MANET, only forwarding route construction messages over bidirectional high-quality links are allowed. A hysteresis-based link quality marking mechanism may be used to identify link quality. To identify link directionality, a modified neighbor advertisement mechanism may be used to identify link directionality. To assure fast route reconstruction, an intelligent mechanism to filter route construction messages is used to assure fast route reconstruction.

Three terms may be used to describe the link directionality. Link-from-neighbor, representing the direction from the neighbor to the local node. Link-to-neighbor, representing the direction from the local node to the neighbor. Link-with-neighbor, representing the bidirectional link between the local node and its neighbor.

Figure 1:
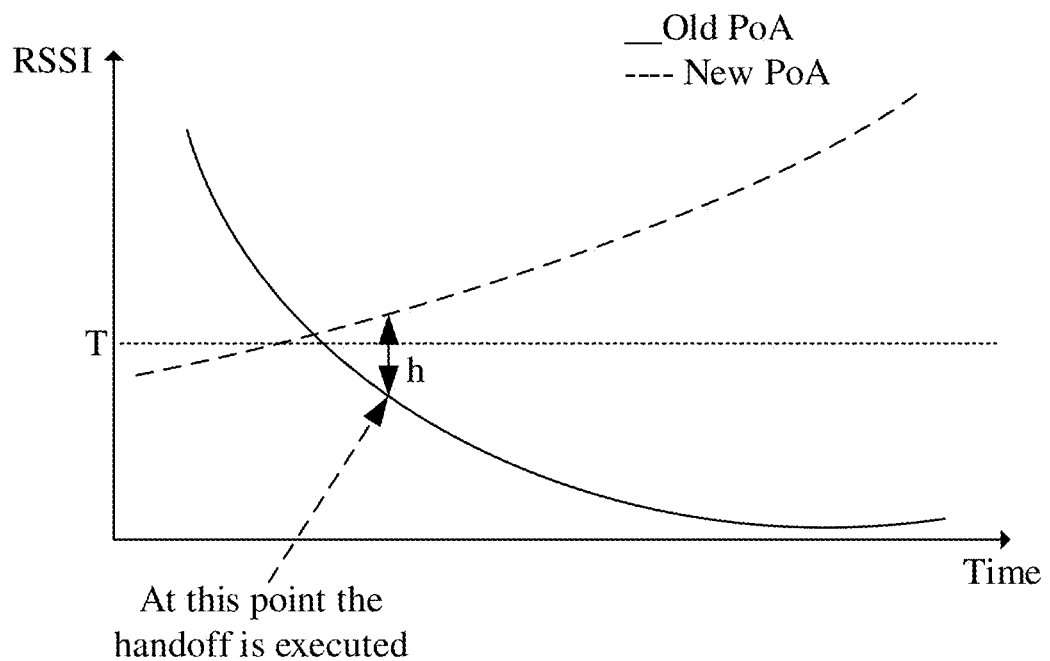
FIG. 1 is a diagram showing a hysteresis-based handoff criterion between two mobile devices.
Figure 2:
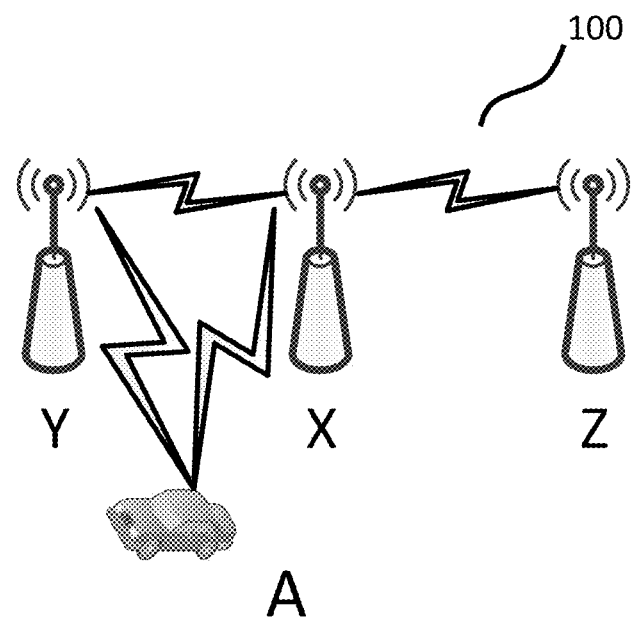
FIG. 2 is a schematic diagram of an example of a mobile ad hoc network.

Referring to FIG. 2, an example of a mobile ad hoc network 100 is shown. The network 100 includes a plurality of mobile nodes, such as A, and/or PoAs X, Y and Z collectively referred to as network nodes. The nodes may be wireless routers, wireless Access Points (APs), laptop computers, tablets, mobile phones, and/or personal digital assistants (PDAs) connected by wireless communication links as appreciated by the skilled person in the art. Each node communicates with one or more neighbors via the wireless communication links.

Each node may periodically (e.g., every $T_A$) send one or more advertising messages, also referred to as advertisements, to the one or more neighbors. Each advertising message may contain route construction/break parameters as well as neighbors' link information, including their addresses and link qualities. FIG. 15 shows an example of an advertising message broadcasted by sender A (shown in FIG. 2). More specifically, a neighbor advertising message may comprise a number of network parameters: a hysteresis low threshold (TL) and a high threshold (TH) that may be used to identify a link quality; a number of packet retransmission tries (R) required before dropping a packet; a number of dropped packets (N) required to mark a link as non-operational; a timeout (T) before assuming that an advertising message is lost; and/or an IP address as well as the last "j–1" link quality marks for each neighbor that has an Operational (OP) link to the local node (OP link-from-neighbor). The list of neighbors and their link qualities may keep changing whereas the rest of the parameters may remain constant.

Figure 14:
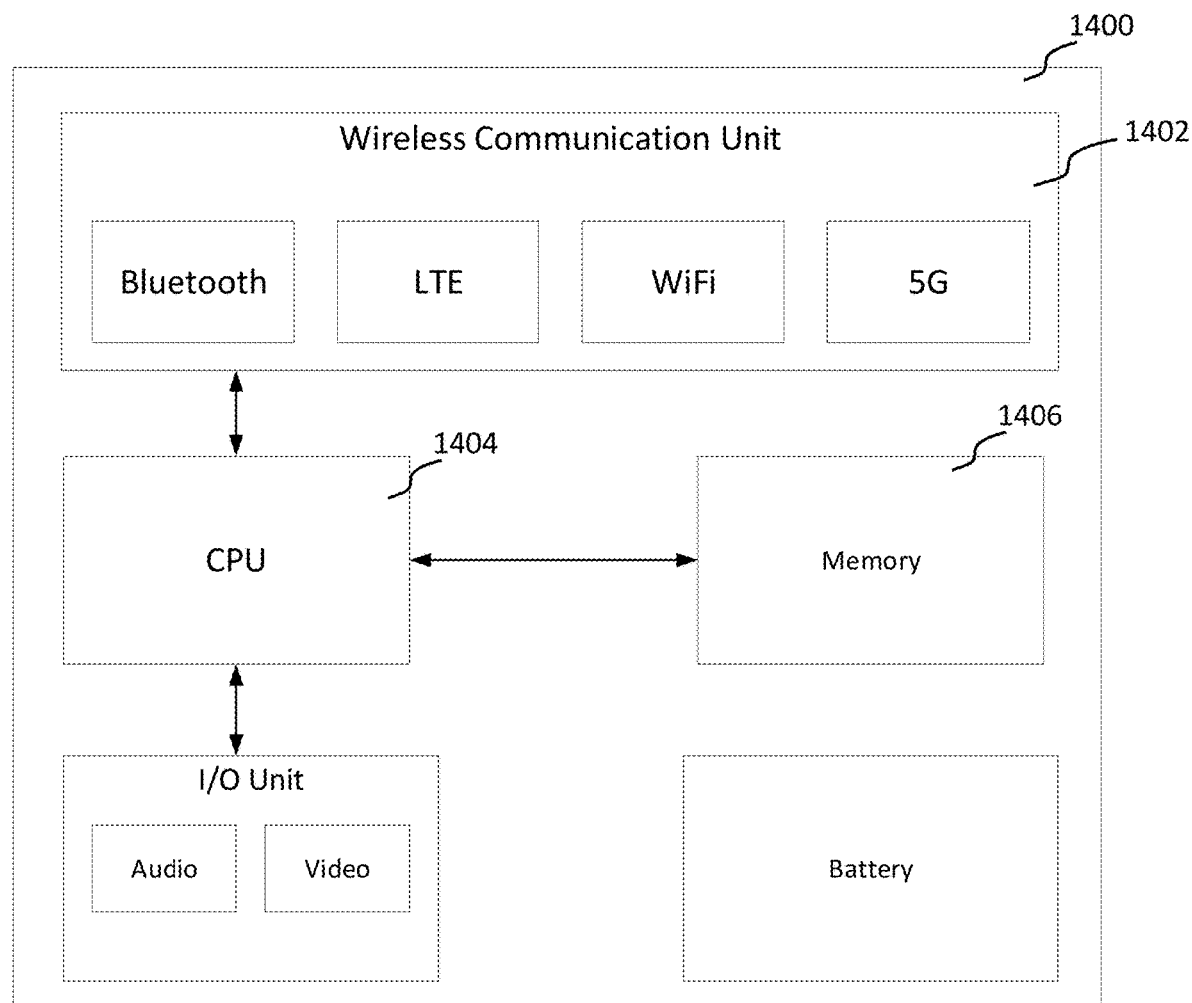
FIG. 14 is a block diagram of a wireless communications-capable device.

FIG. 14 depicts a block diagram of a mobile device 1400 executing instructions to perform the handover. The Wireless Communications Unit 1402 transmits and receives packets as well as determining a set of physical layer parameters (e.g., RSSI, BER, SNR, SNIR, etc.). The wireless communications unit 1402 may provide a number of wireless communication mediums, such as Bluetooth®, LTE, WiFi, and/or 5G. The CPU 1404 executes instructions for determining a set of Medium Access Control (MAC)

layer parameters (e.g., number of transmissions retry, number of dropped packets, etc.) as well as executing the instructions to determine the link quality and a link directionality. The memory unit 1406 may store instructions and the node's local link parameters as well as the neighbors' link info so the local link parameters can be invoked by the instructions responsible for marking the link quality and link directionality.

Figure 4:
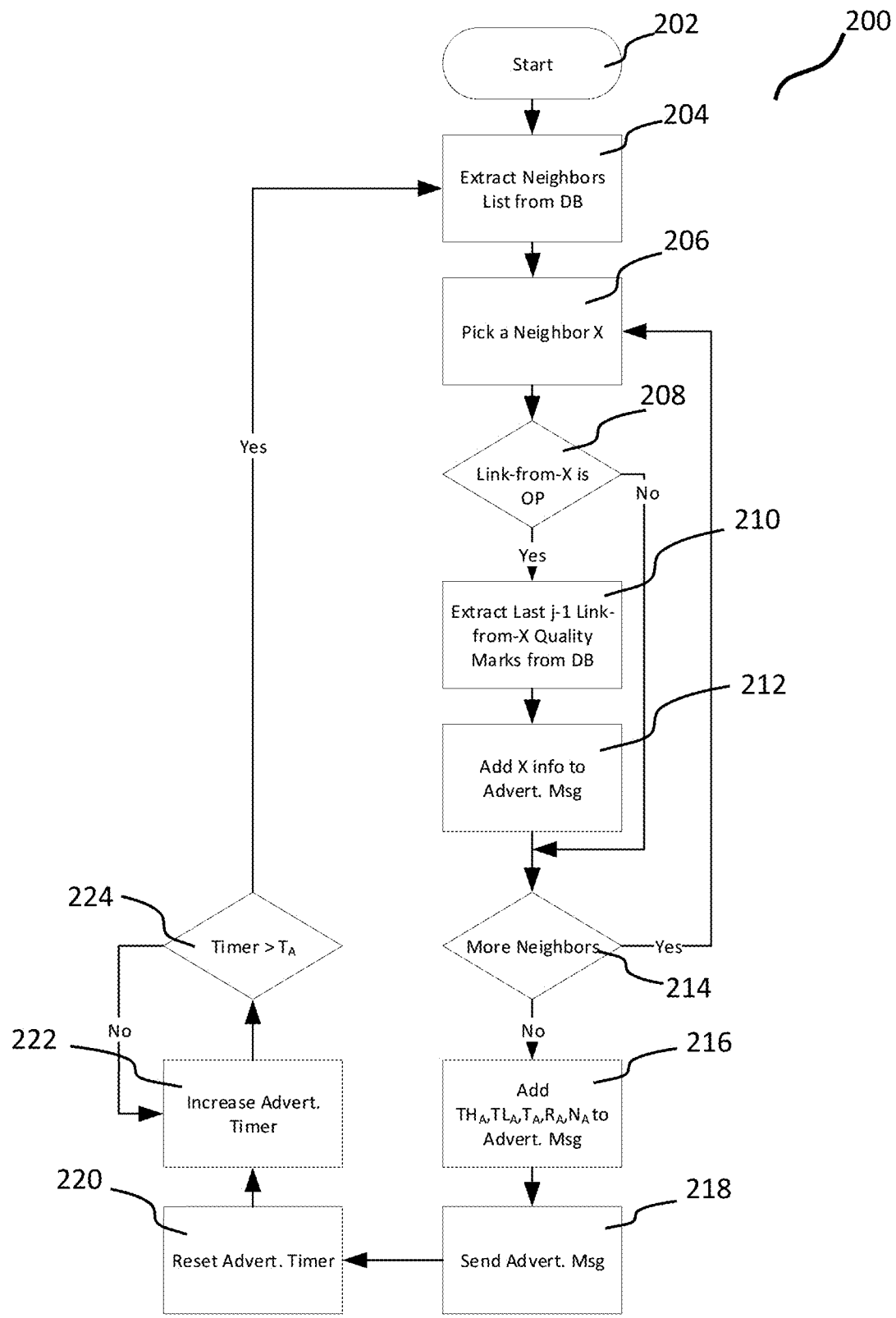
FIG. 4 is a flowchart illustrating a routine used for sending advertisement messages between the nodes.

The neighbor advertising messages may be used to identify the link quality and the link directionality as well as assuring fast route reconstruction. The flowchart in FIG. 4 shows a routine 200 used for sending the neighbor advertisement messages. When a local node A, such as a mobile phone, starts to communicate with one or more neighbors starting at step 202, a neighbor list may first be extracted from a database (DB) by the local node A at step 204. Then the local node A picks a selected neighbor, such as node X, from the one or more neighbors at step 206. The link-from-X is detected if the selected neighbor is operational (OP) at step 208 according to a hysteresis-based link quality marking mechanism as described herein. If the link is determined to be operational at step 208, then a last j−1 link-from-X quality marks are extracted from a database at step 210. The node X info (e.g. IP address and the last j−1 link-from-X quality marks) is added to the advertising messages at step 212. The node A keeps checking if there are more neighbors at step 214. If the link-from-X is determined to be not operational at step 208, the node A keeps checking if there are more neighbors at step 214. If a new neighbor exists, the new neighbor is picked, and the process from step 208 to step 212 may be repeated to the new neighbor. Otherwise, if there is no new neighbor, one or more route construction/break parameters (e.g., $TH_A$, $TL_A$, $R_A$, $N_A$, and $T_A$ where the subscript refers to the node itself) are added to the advertising messages of the node A at step 216. Then the advertising messages are sent out at step 218. An advertisement timer is reset at step 220. As the advertisement timer increases at step 222, the timer is read to determine if the timer exceeds a predetermined time limit $T_A$ at step 224. If the timer does not exceed the time limit, the timer keeps incrementing while the node A to send out more advertisement messages. If the timer exceeds the time limit $T_A$, the node A may restart the process from step 204 by extracting an updated neighbor list again.

The neighbor advertising messages are used to identify the link quality and the link directionality as well as assuring fast route reconstruction. To prevent a ping-pong effect, that is when a node keeps handing over forth and back between two adjacent PoAs due to signal fluctuations around a hand-over threshold, a hysteresis-based marking algorithm is used to identify the link quality. For example, an RSSI of the neighbor advertising messages may be used based on the hysteresis-based marking algorithm to identify the link quality from the advertising neighbor. The link quality mark may be later used to determine the link operationality.

Figure 5:
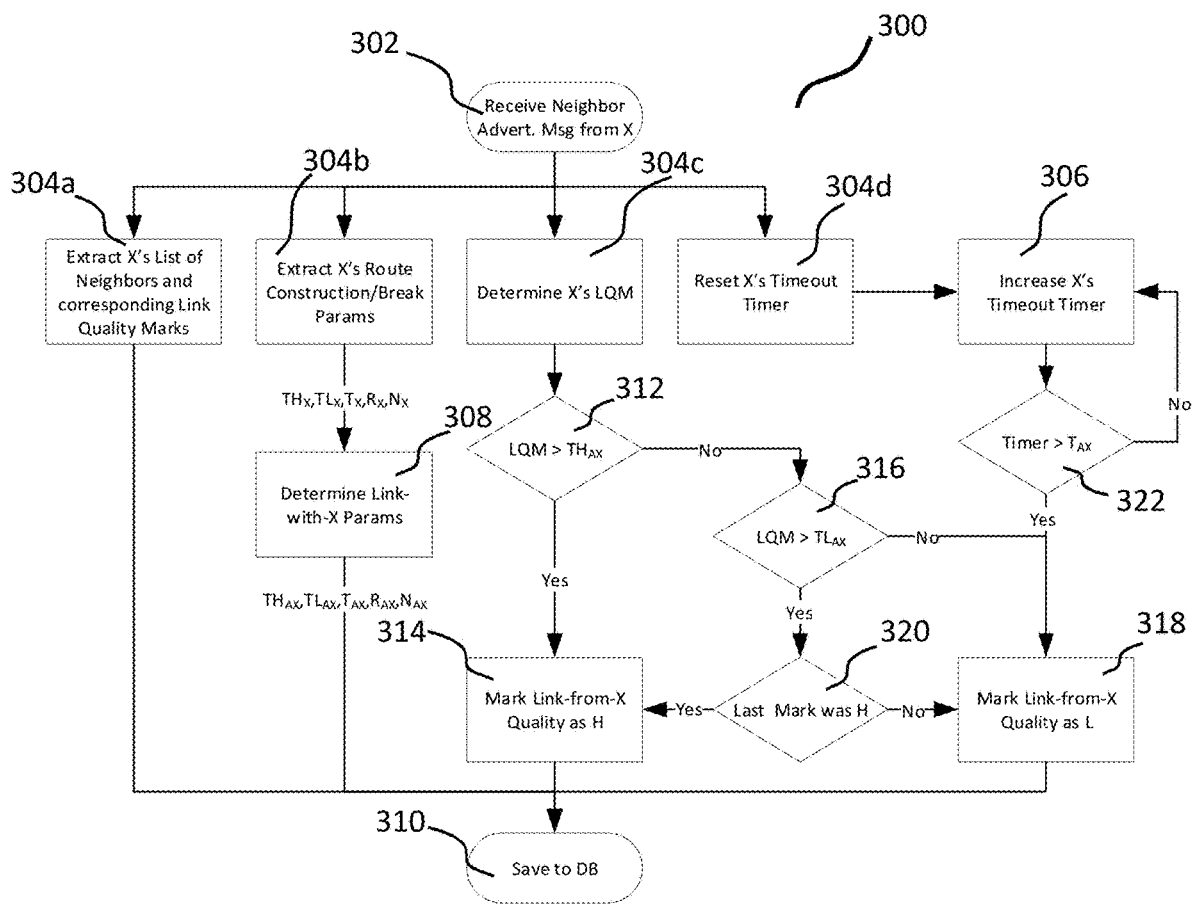
FIG. 5 is a flowchart illustrating a link quality marking routine.

The hysteresis-based link quality marking mechanism is now discussed in detail with reference to FIG. 5. The flowchart illustrates a process 300 used to mark the link quality based on the value of a Link Quality Measurement (LQM) of the advertising messages as described herein. The link quality measurement may comprise the link RSSI, BER, SNIR, SNR, etc. and/or any combination thereof. Once the advertising messages are broadcasted by a node, such as node X, the advertising messages may be received by the one or more neighbors at step 302. In particular, the recipient, such as node A, extracts the list of the neighbors and their corresponding link quality marks at step 304*a*. Meanwhile, advertised route construction/break parameters from the neighbor X, such as threshold parameters THx and TLx, packet drop parameters Nx and Rx, and timeout parameter $T_x$ are extracted at step 304*b*. The value of the LQM of the received advertising messages is determined at step 304*c* and the sender timeout timer is reset at step 304*d*. As the process proceeds, the timeout timer keeps increasing at step 306. The advertised route construction/break parameters (e.g. $TH_X$, $TL_X$, $T_X$, $R_X$ and $N_X$) obtained at step 304*b* may be compared with the local route construction/break parameters (e.g. $TH_A$, $TL_A$, $T_A$, $R_A$ and $N_A$) to determine the link-with-X (e.g. those of link-from-X and link-to-X) at step 308 (e.g. determine $TH_{AX}$, $TL_{AX}$, $T_{AX}$, $R_{AX}$ and $N_{AX}$). More specifically, $TH_{AX}$ and $TL_{AX}$ are set to the maximum between the announced values and the local ones (e.g. $TH_{AX}=\max(TH_A, TH_X)$, $TL_{AX}=\max(TL_A, TH_X)$). $T_{AX}$ is set to the advertised value plus a small time duration, ε (typical values for a can be in few milliseconds), to account for transmission delays (e.g. $T_{AX}=T_X+\varepsilon$). $R_{AX}$ and $N_{AX}$ are set to a minimum between one or more announced values and one or more local ones (e.g. $R_{AX}=\min(R_A, R_X)$, $N_{AX}=\min(TH_A, TH_X)$). These link-specific parameters obtained at step 308 are stored in a database of the recipient at step 310, and are used as local parameters for evaluating next received advertisement messages. None of the minimum values should be advertised to keep the changes specific to each link. Unlike other solutions, the advertising route construction/break parameters allows the network to locally adapt to different links' QoS requirements without increasing a network-wide signaling overhead.

Figure 6:
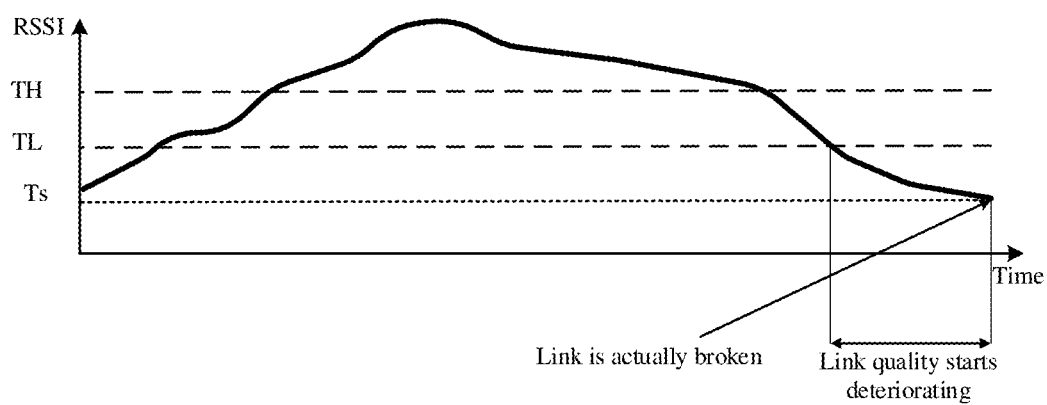
FIG. 6 is a diagram showing a hysteresis-based link quality marking criterion.

The value of the LQM of the last received advertising message determined at step 304*c* is then compared with the high threshold $TH_{AX}$ and the low threshold $TL_{AX}$ based on the hysteresis mark algorithm demonstrated according to the example shown in FIG. 6 to determine the link quality. The details of how the link quality is marked are as follows:

a. When the value of LQM of the received neighbor advertisement determined at step 304*c* exceeds the hysteresis high threshold ($TH_{AX}$) at step 312, the link-from-X quality is marked as H at step 314.

b. When the value of LQM of the received neighbor advertisement determined at step 304*c* falls below the hysteresis low threshold ($TL_{AX}$), the link-from-X quality is marked as L at step 318.

c. When the value of the LQM of the received neighbor advertisement determined at step 304*c* is below the hysteresis $TH_{AX}$ and above $TL_{AX}$ at step 316, the last link-from-X quality mark is determined at step 320. If the link quality was marked as H in the last cycle, the link quality may also be marked as H at this cycle at step 314. Otherwise, it may be marked as L at step 318.

d. If the timeout timer for receiving an advertisement message from a neighbor expires before the node receives an advertisement from that neighbor at step 322, the link-from-neighbor quality is marked as L at step 318. The results of link quality are all saved in the local database of the node.

e. Each time the advertisement message is successfully received, the timeout timer is reset at step 304*d*.

According to some aspects, the mobile nodes perform handover instructions when a link quality measurement falls below a sensitivity threshold (Ts), below which the connection is considered broken. In this invention, TL is chosen to be significantly higher than Ts, as shown in FIG. 6, such that the link performance meets a specified broadband requirement during the transition time between the signal being lower than the hysteresis low threshold and the actual decision of marking the link as non-operational. For example, if a minimum data rate is required, TL is set to a value that ensures the requirement is met. When RSSI is used as a link quality measure, typical values can be where Ts equals −92 dBm, then TL may be set to −80 dBm which would make sure that the link quality is maintained during the handover transitional period.

After the link-from-neighbor quality has been marked, the link operationality may be determined based on a score calculated by a function of the last j link quality marks (j is a value that is selected to maintain a balance between rapid response and stability), acquired via the neighbor advertisement technique previously described. This function may be either a statistical function (e.g., median, majority vote, etc.) or a mathematical function, after assigning high and low link quality marks numerical values (e.g., numerical average, etc.). For link-from-neighbor, the j marks may be extracted from a database representing the last j link quality marks determined by process 300. For link-to-neighbor, the j marks are defined as follows: j−1 marks extracted from the DB (e.g. those extracted from the last neighbor advertisement in step 304a) plus one always assumed as L.

Figure 7:
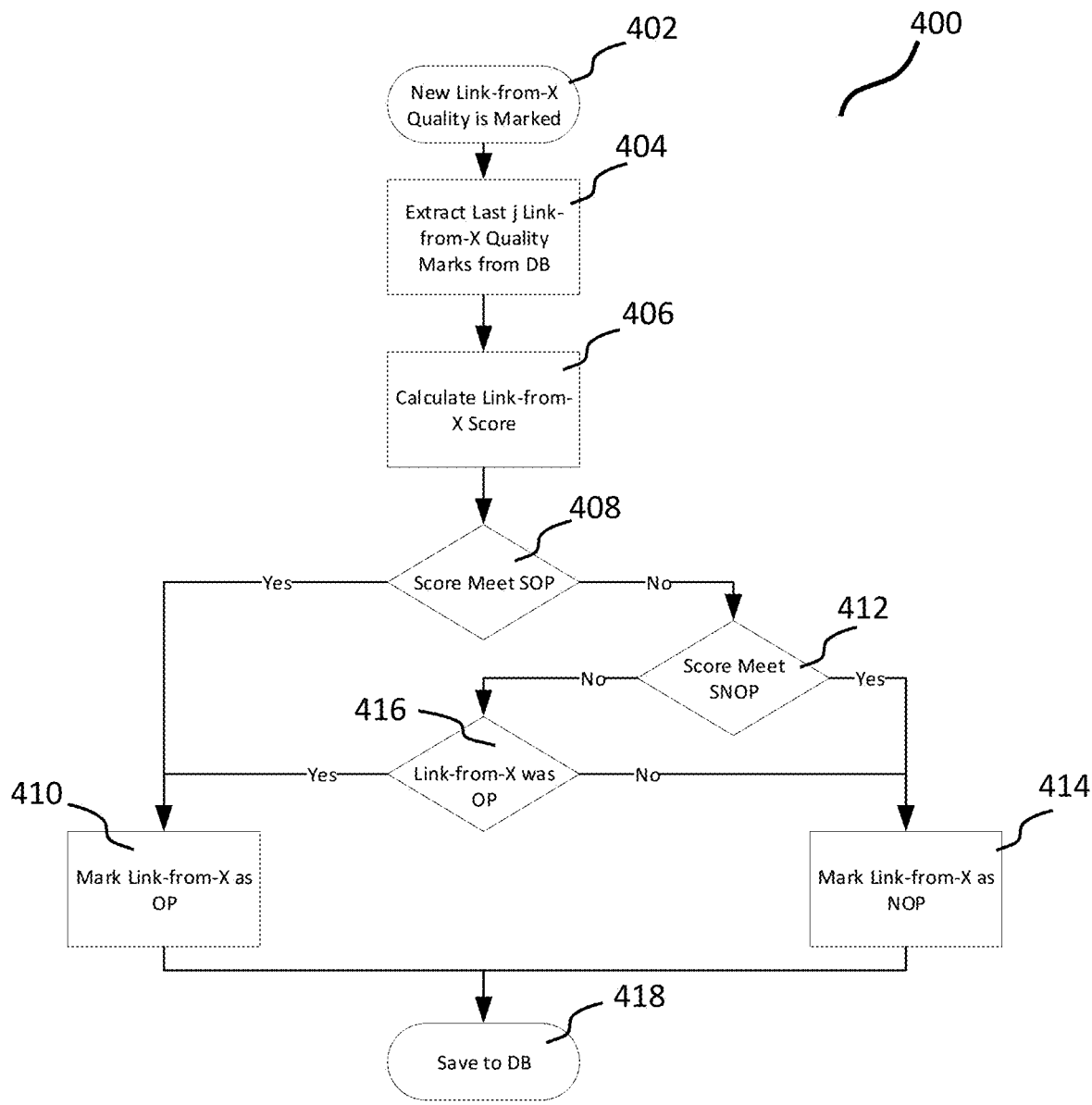
FIG. 7 is a flowchart illustrating a link-from-neighbor operationality determination process.

FIG. 7 shows a flowchart to illustrate a routine 400 used to determine a link-from-neighbor operationality based on the neighbor advertisement messages as described herein. Each time after the link-from-neighbor quality, such as that for neighbor X, is marked at step 402, the last j marks are extracted from a database at step 404. A score of link-from-X is calculated at step 406. The link-from-X operationality is determined as follows:
  a. If the score meets the criterion for validating the link, Score-Operational (SOP), at step 408:
    The node marks the link-from-X as directionally Operational (OP) at step 410.
    The node starts advertising the IP address of that neighbor as well as the last j−1 link-from-X quality marks (as stated in routine 200 described above).
The SOP is consistent with the method used for calculating the link-from-neighbor score in step 406 (e.g., if we use the average value in step 406, the SOP would be a numerical value representing when the link is validated.)
  b. Otherwise, if the score meets the criterion for invalidating the link, Score-Non-Operational (SNOP), at step 412:
    The node marks the link-from-X as directionally Non-Operational (NOP) at step 414.
    The node stops advertising the neighbor IP address and the link quality from that neighbor (as stated in routine 200 described above).
The SNOP is consistent with the method used for calculating the link-from-neighbor score in step 406 (e.g., using the average value in step 406, the SNOP would be a numerical value representing when the link is invalidated.)
  c. If the score does not meet the SOP and the score does not meet the SNOP, the node maintains the previous mark. The last link operationality is checked at step 416. If the link was OP, the node marks the link-from-X also as OP. Otherwise, the node marks the link-from-X as NOP.
  d. All the results of the link-from-X operationality are saved to a database of the node at step 418.

Figure 8:
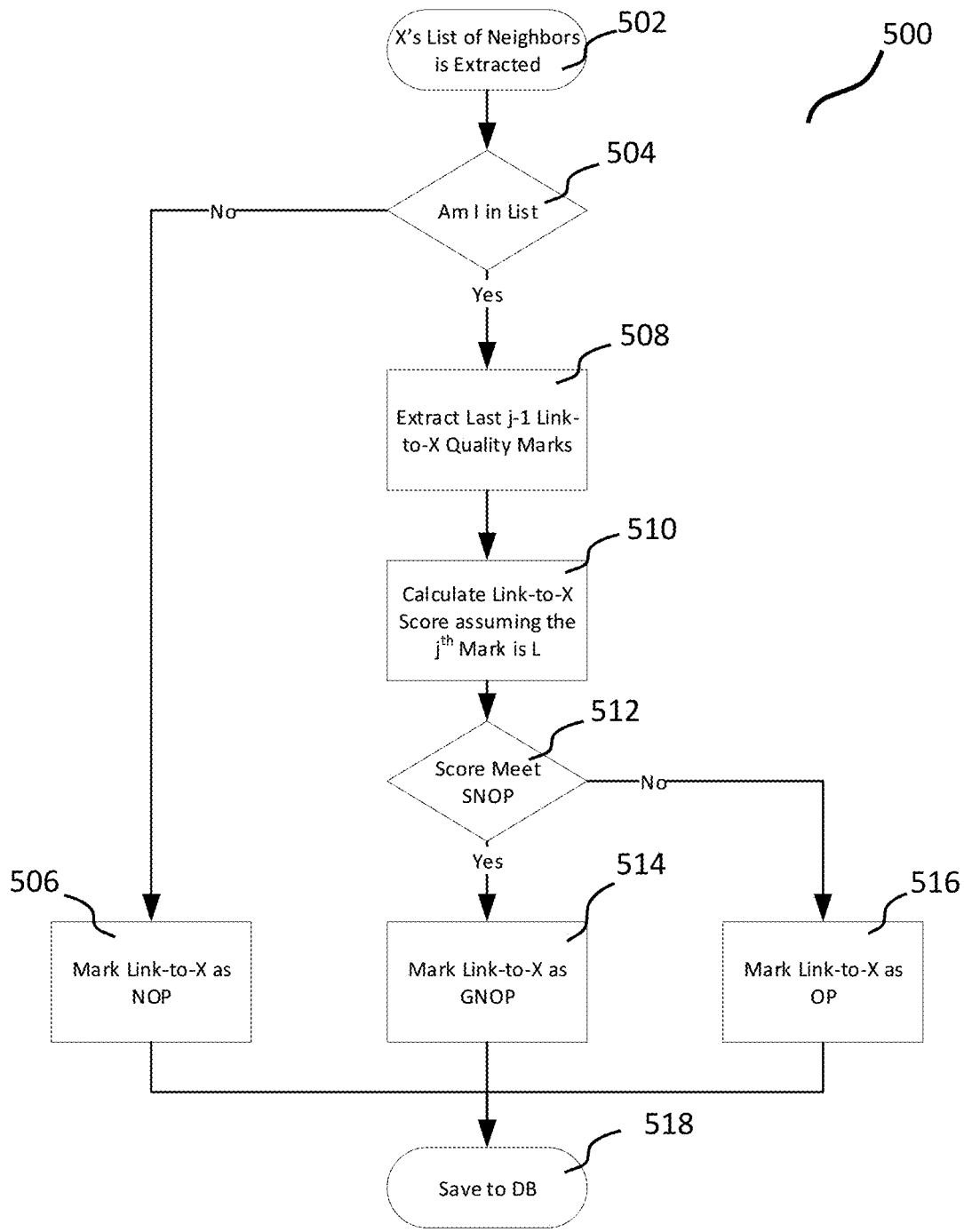
FIG. 8 is a flowchart illustrating a link-to-neighbor operationality determination process.

On the other hand, a link-to-neighbor operationality based on the neighbor advertisements as described herein is determined, and illustrated in the flowchart 500 in FIG. 8. Each time the advertisement is received. A list of the neighbors associated with the sender of the advertisement is extracted at step 502. The node then checks if the node's own IP address is in the neighbor list at step 504. The details of the link-to-neighbor operationality may be determined as follows:
  a. When the node does not find its own IP address in the neighbor advertisement at step 504, the node marks the link to that neighbor as NOP at step 506.
  b. When the node finds its own IP address in the neighbor advertisement at step 504, the node extracts the last j−1 link-to-X quality marks at step 508. The node then calculates the link score to that neighbor using the last j marks, using the advertised last j−1 link quality marks and assuming that the $j^{th}$ mark is low (e.g. L), at step 510. The link-to-neighbor score is compared with SNOP at step 512.
    If the score does not meet the criterion for SNOP, the node marks the link to that neighbor as Going-Non-Operational (GNOP) at step 514.
    Otherwise, the node marks the link to that neighbor as OP at step 516.
All the results of the link operationality are saved in a database of the node at step 518.

In addition to the method described above to determine a link operationality based on received neighbor advertisements, the method may rely on packet transmission failure to determine the link operationality in both directions. Relying on packet transmission may be particularly adept at detecting sudden drops in link quality caused by mobility due to large-scale fading (e.g., turning around a corner). In cases where a node fails to transmit a packet to a neighbor, the process 600 to determine the link operationality of both link-from-neighbor and link-to-neighbor is shown in flowchart of FIG. 8, and is discussed as follows:
  a. When a node fails to transmit a packet to a neighbor at step 602, the packet retransmission counter, r, and packet drop counter, n, are set to 0 at step 604.
  b. The number of the packet retransmission counter is then compared with a predetermined value of parameter $R_{AX}$ at step 606. When the packet retransmissions counter for the neighbor does not exceed $R_{AX}$ at step 606, the node keeps retransmitting the packet at step 608 and the transmission is tested to see if the transmission fails again at step 610. If failed, the number of packet retransmissions counter is increased at step 612 and may be compared with the parameter $R_{AX}$ again to repeat the process.
  c. When the packet retransmissions counter for a neighbor exceeds $R_{AX}$ at step 606, a dropped packet counter for that neighbor is increased by 1 at step 614.
  d. The number of the dropped packet counter is compared with a predetermined value $N_{AX}$ at step 616. When the dropped packet counter for a neighbor does not exceed $N_{AX}$ at step 616, the packet retransmission counter is reset at step 618 and the packet is retransmitted again at step 608.
  e. When the dropped packet counter for a neighbor exceeds $N_{AX}$ at step 616,
    The last j−1 link-from-neighbor marks are flushed, preventing marking that link as OP for the next j marks at step 620.
    Both link-to-neighbor and link-from-neighbor are immediately marked as NOP at step 622.
    All the new link markings are then stored in a database at step 624.
  f. Each time a node succeeds in transmitting a packet to a particular neighbor, the procedure ends at step 626 leaving the link marks intact.

Figure 9:
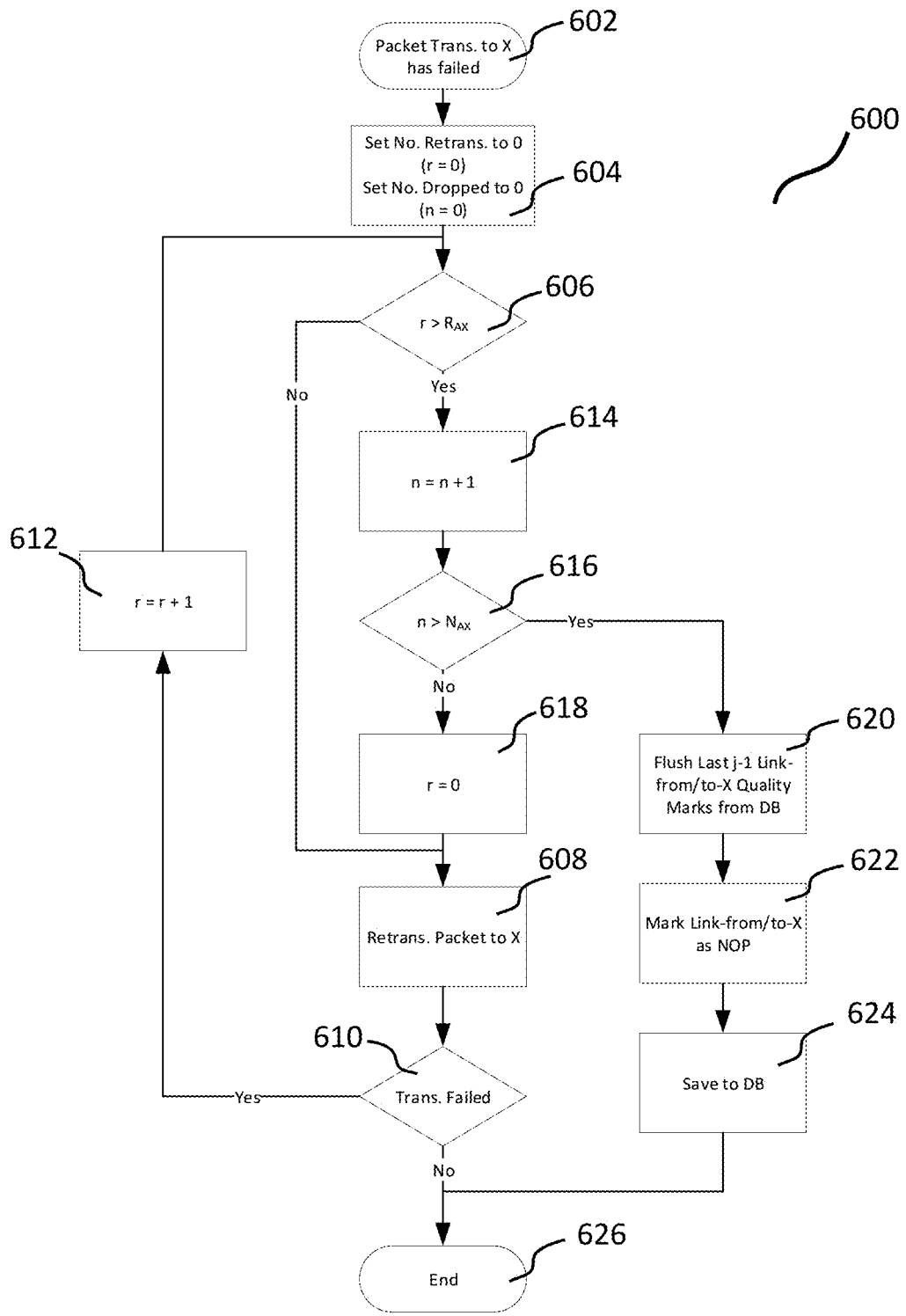
FIG. 9 is a flowchart illustrating a routine used to respond to packet transmission failure to determine the link operationality of both link-from-neighbor and link-to-neighbor.
Figure 10:
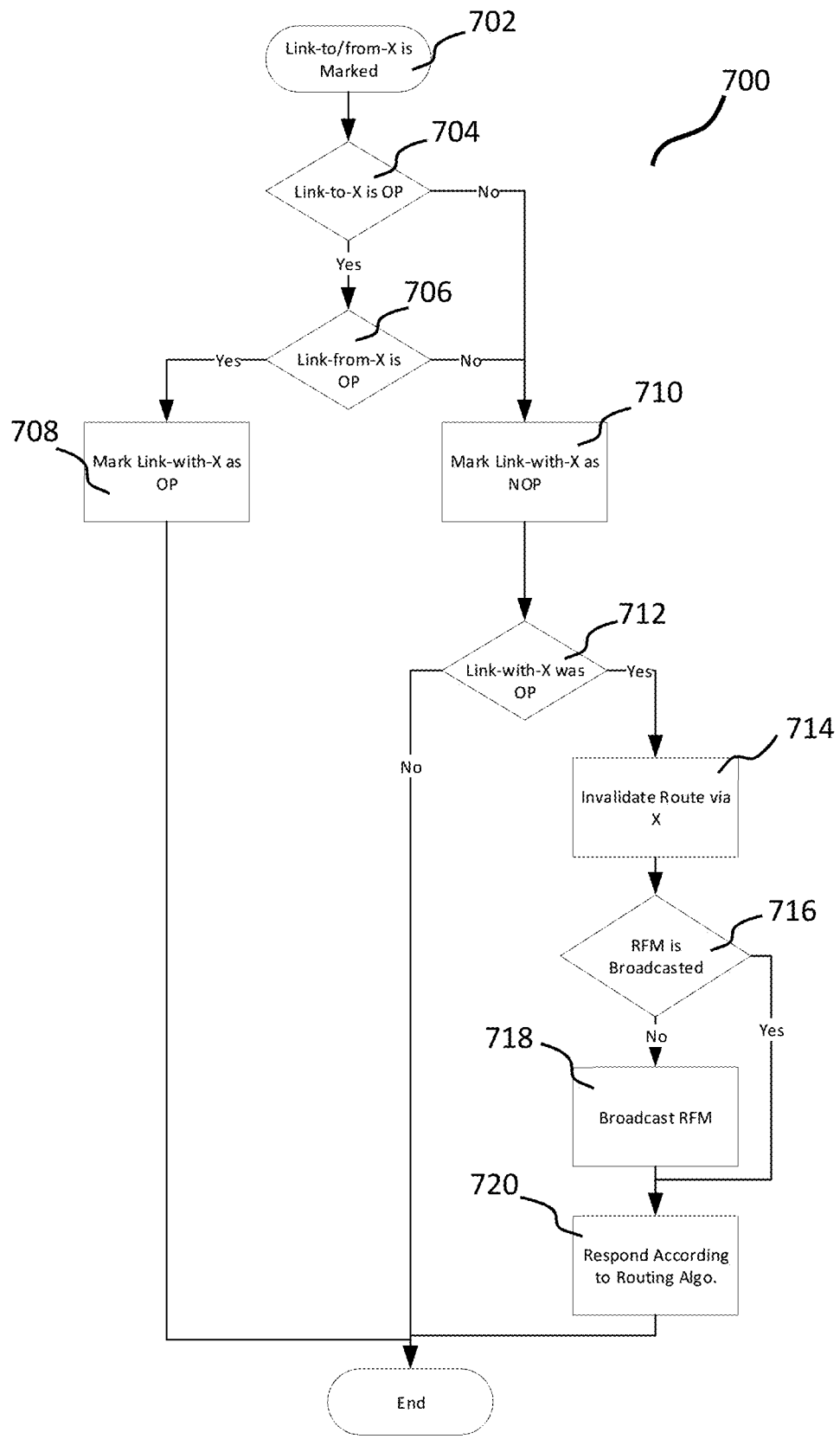
FIG. 10 is a flowchart illustrating a routine to determine whether the link is bidirectionally operational.
Figure 11A:
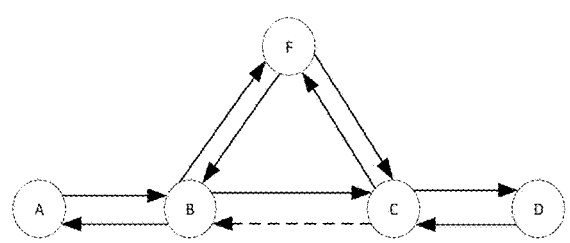
FIGS. 11 (a)-11 (d) illustrate an example of a prior route construction process.
Figure 11B:
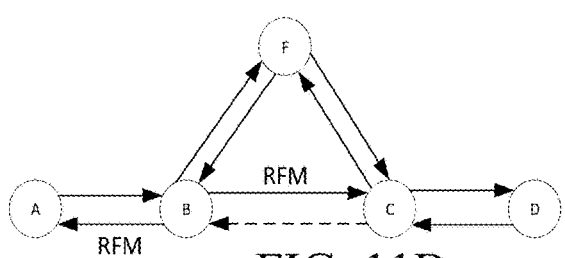
Figure 11C:
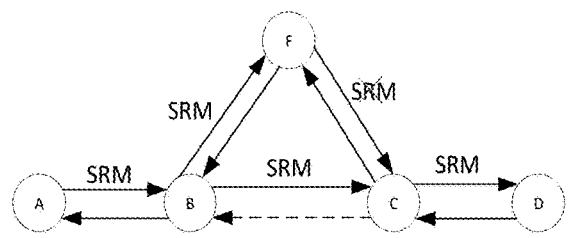
Figure 11D:
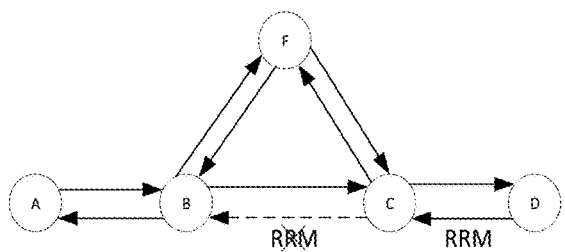

In addition to the situations discussed above, if and only if both links from/to a neighbor are marked as OP, the link-with-neighbor is marked as bidirectionally OP. The flowchart in FIG. 9 depicts a process 700 to determine whether the link is bidirectionally operational as follows. After link-to/from-neighbor operationality are marked at step 702, the link-to-neighbor operationality is checked at step 704. If the link-to-neighbor is marked OP at step 704, the link-from-neighbor is further checked at step 706.

a. If both link-from-neighbor and link-to-neighbor are marked OP:
  The node marks the link-with-neighbor as bidirectionally OP at step 708.
  The node starts forwarding packets over this link.
b. If either link-to-neighbor or link-from-neighbor is marked NOP at step 704 and step 706, respectively:
  The node marks the link-with-neighbor as bidirectionally NOP at step 710.
  The previous state of the link-with-neighbor is further checked at step 712. If the previous link state was NOP, then the node does nothing.
  If the link-with-neighbor was marked as OP at step 712, the node immediately invalidates all routes that use this link at step 714.
  Broadcasting a Route Failure Message (RFM) (e.g., RERR in DSR and AoDV) is checked out whether it is required by the routing method being used at step 716.
  If the routing method being used does not require broadcasting such a message at step 716, the node may still broadcast the RFM at next step 718. RFMs may be sent to upstream nodes (e.g. nodes closer to the route source), using unicast transfer mode. Therefore, there is no guarantee that the downstream node (e.g. the node with which the connection has been lost) may receive this notification. Broadcasting RFMs may be used, as will be explained in routine 900, to help the downstream node in identifying when bidirectional links become unidirectional.
  The node then responds according to the routing method being used at step 720.

As each node dynamically moves and/or experiences a degradation in transmission and/or reception, the link quality between the nodes periodically changes. For example, as the distance between two mobile nodes increases, the link quality between the two mobile nodes deteriorates. A route reconstruction may be used to update the link. However, due to the probabilistic differences in the transmission power and receiver sensitivity, one node may likely mark the link as non-operational before the other node (e.g., the link becomes unidirectional). When the node identifies that the link became non-operational, the other node may identify that link as non-operational only after receiving the next neighbor advertisement. Hence, starting the route reconstruction process (e.g., sending the Seek Route Message (SRM)) before sending the neighbor advertisement message (e.g., announcing the change in link directionality) may cause the reconstruction attempt to fail, significantly delaying the route reconstruction process.

FIG. 11 illustrates this problem in a detailed manner. Assume that node A communicates with node D via intermediate nodes B and C. When the link between B and C becomes unidirectional due to node B movement away from node C, as shown in FIG. 11(a). When node B marks the link-form-C as NOP, node B responds by sending a Route Failure Message (RFM) (e.g., the RERR in DSR and AoDV) invalidating routes to destinations C and D, as shown in FIG. 11(b). When the node A receives that RFM, node A responds by sending a Seek Route Message (SRM), such as the RREQ in DSR and AoDV, to reconstruct a route to D, as shown in FIG. 11(c). Since link-from-B is not broken yet at node C, node A receives the SRM from B and discards the SRM from F. Then, node B rebroadcasts the SRM, as shown in FIG. 11(c). When node D receives the SRM, node D responds by sending a Route Return Message (RRM), such as the RREP in DSR and AoDV. When node C receives the RRM, node C sends the RRM to node B. However, the RRM may not be transmitted successfully over a unidirectional link, causing the route reconstruction process to fail. Only when node C receives the neighbor advertisement from node B, node C marks the link-with-B as NOP, discarding any received SRM from node B. After that the route from A to D can be reconstructed successfully through node F.

In order to solve the above problem, a route construction method using intelligent filtering algorithm is described herein to reduce the reconstruction response time without increasing the signaling overhead. The intelligent route construction method includes a process to respond to receiving an SRM and a process to respond to receiving an RFM. Instead of reconstructing routes only when forwarding links' quality severely deteriorates, the solution described herein reconstructs routes when the forwarding links' quality falls below a predefined threshold that may be significantly above the link sensitivity threshold, thereby maintaining high QoS support. The intelligent route construction method is discussed below in detail.

Figure 12:
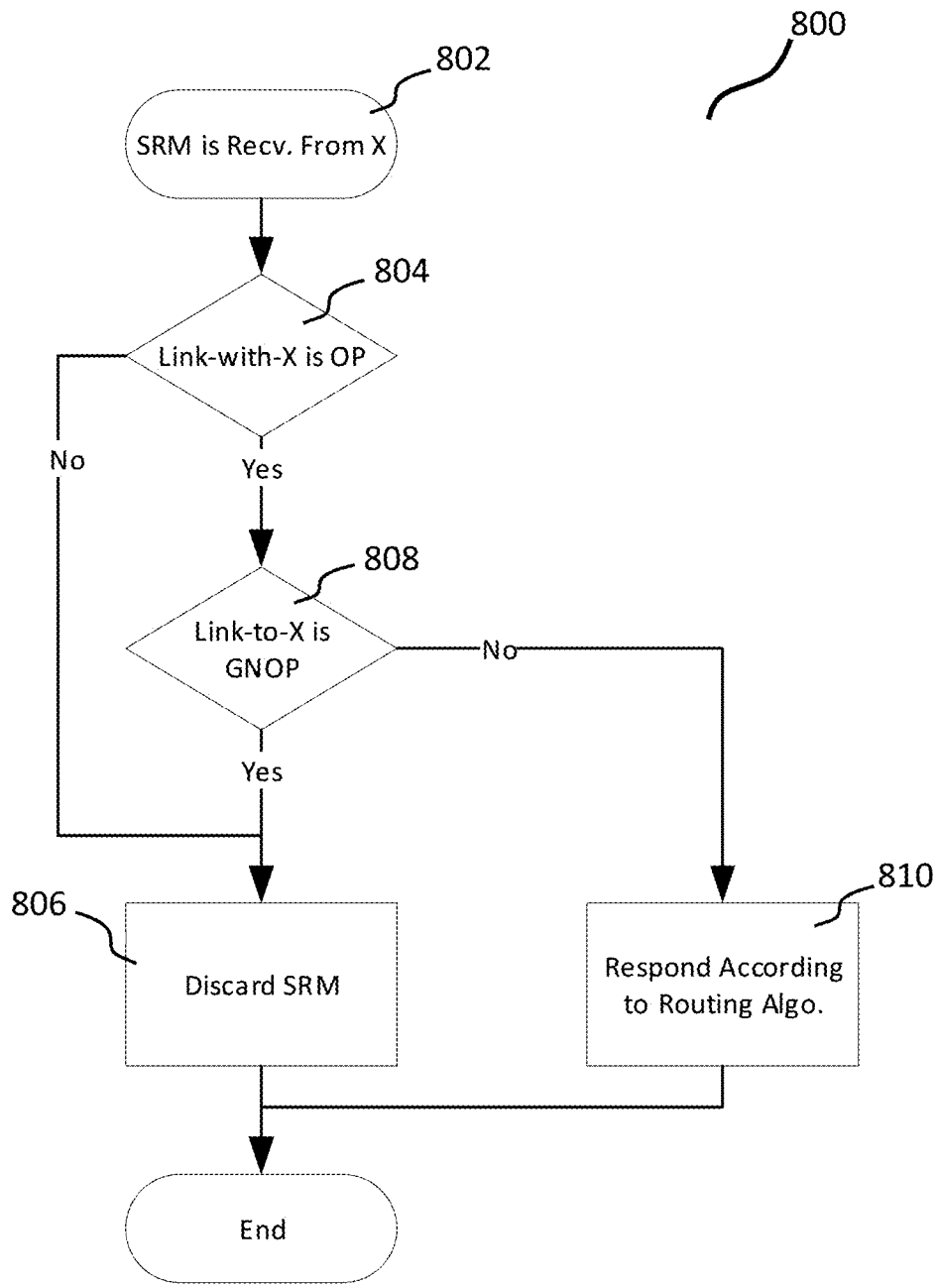
FIG. 12 is a flowchart illustrating a routine used to respond to receiving a Seek Route Message (SRM) in route construction.

Referring to FIG. 12, the flowchart depicts a routine 800 used to respond to receiving an SRM. More specifically, when an SRM is received from a neighbor node, for example from node X, at step 802, the link quality of link-with-neighbor is checked at step 804.

a. If the node receives an SRM over NOP link-with-neighbor at step 804, the node discards the received SRM message at step 806.
b. If the node receives an SRM over an OP link-with-neighbor at step 804:
  If the link-to-neighbor is marked as GNOP at step 808, the node discards the received SRM message. This operation may prevent constructing routes over non-reliable links, as receiving SRM from a neighbor could be triggered by the fact that the link to that neighbor has become NOP.
  Otherwise, the node responds to it at step 810 according to the routing method being used.

Figure 13:
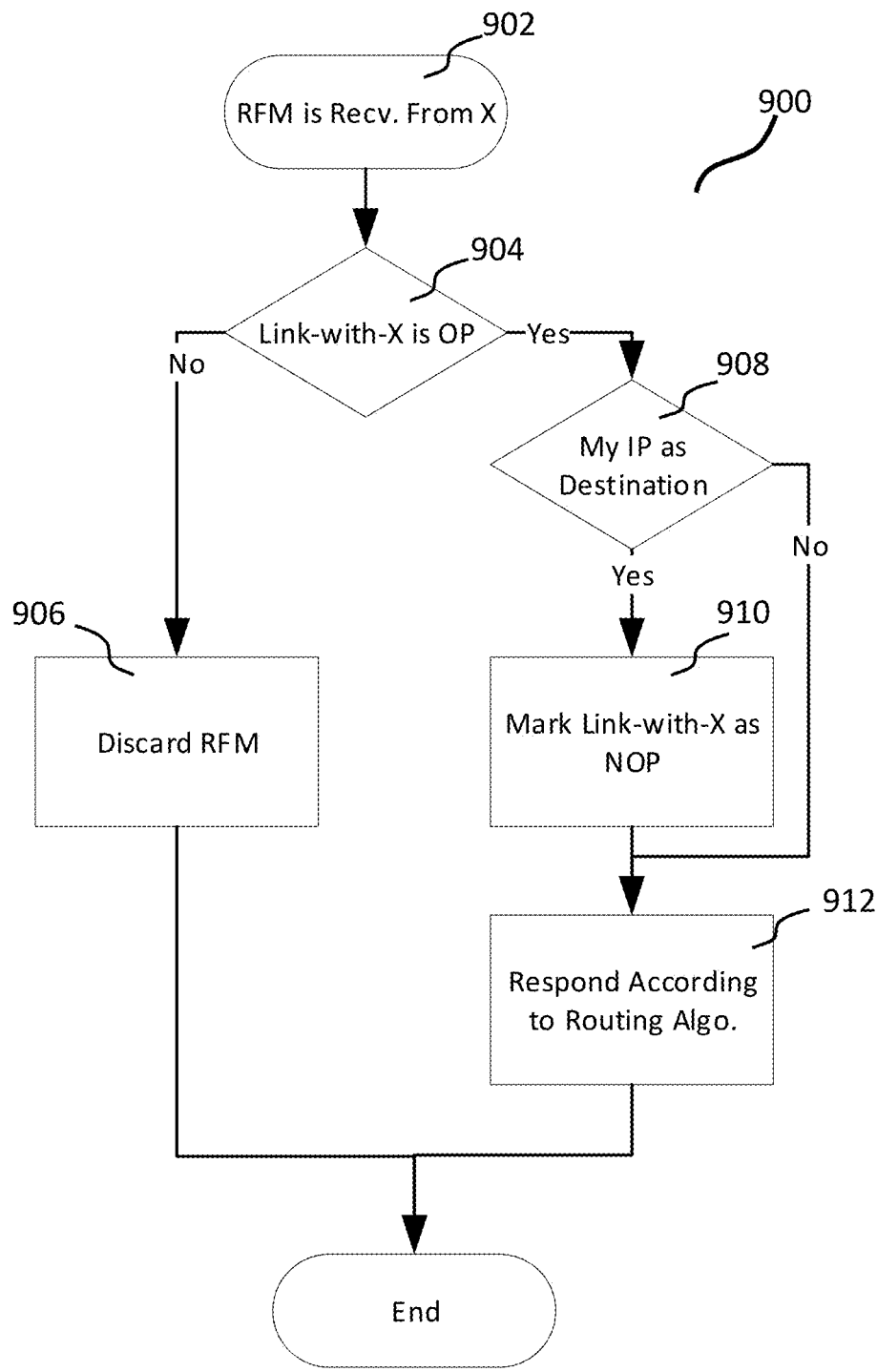
FIG. 13 is a flowchart illustrating a routine used to respond to receiving a Route Failure Message (RFM) in route construction.

On the other hand, a routine 900 used to respond to receiving an RFM is depicted in the flowchart in FIG. 13. More specifically, when an RFM is received from a neighbor node, for example from node X, at step 902, the link quality of link-with-neighbor is checked at step 904.

a. When the node receives an RFM over a NOP link-with-neighbor at step 904, the node discards the received message at step 906.
b. When the node receives an RFM over an OP link-with-neighbor at step 904:
  If the RFM has the node's own IP address among the non-reachable destinations (which can be determined via routine 700 as an example) at step 908, the node immediately marks the link-with-neighbor as NOP at step 910 (this includes marking link-from/to-X as NOP) and invalidates the route using that link.
  Then, the node responds based on the routing method being used at step 912.

As described herein may provide a scalable and fast routing method to detect changes in link status and to promptly reconstruct failed routes so as to enable seamless mobility within MANETs.

Unlike prior methods which require broadcasting extra control messages (e.g., signaling overhead), the methods described herein do not require transmitting any extra control message, facilitating fast route reconstruction without affecting the scalability of the solution or reducing the network capacity.

Instead of utilizing the reliable multicasting acknowledgements technique to detect sudden changes in link status, the methods described herein rely on the normal unicast MAC-level acknowledgements to detect sudden changes, facilitating prompt route reconstruction without affecting the scalability of the route reconstruction solution or reducing the network capacity.

Instead of reconstructing routes only when forwarding links' quality severely deteriorates, the methods described herein reconstructs routes when forwarding links' quality falls below a predefined threshold that is significantly above the link sensitivity threshold, thereby maintaining high QoS support.

Instead of globally increasing the signaling overhead so as to reduce route reconstruction response time, the methods described herein reduces the response time only for mobile nodes, only increasing the signaling overhead where and when the overhead is required to maintain stable connections.

Instead of using both reactive and proactive solutions to reconstruct routes, the methods described herein use a proactive solution, reducing the signaling overhead.

Instead of increasing the transmission rate of the advertisement messages to reduce the reconstruction response time, the methods described herein intelligently respond to route construction messages, reducing the reconstruction response time without increasing the signaling overhead.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A routing method of a mobile ad-hoc network, the mobile ad-hoc network including a plurality of nodes, each node communicating with at least one neighbor via at least one communication link, the method comprising:
    each node transmitting an advertisement;
    each node identifying a link quality with each of the at least one neighbor providing at least one mark based on a link quality metric;
    each node identifying a link operationality with each of the at least one neighbor by evaluating a score calculated from the at least one mark; and
    each node reconstructing at least one route with the at least one neighbor by filtering at least one route construction message related to the link operationality of the at least one neighbor;
    wherein the link quality metric comprises:
    marking the link quality as high when the link quality metric exceeds a high threshold;
    marking the link quality as low when the link quality metric falls below a low threshold;
    marking the link quality as high when the link quality metric falls below the high threshold, and before the link quality metric falls below the low threshold;
    marking the link quality as low when the link quality metric rises above the low threshold, and before the link quality metric exceeds the high threshold; and
    marking the link quality as low when a timeout timer for receiving the advertisement expires before receiving a new advertisement from the at least one neighbor.

2. The routing method according to claim 1, wherein the link quality metric is hysteresis-based.

3. The routing method according to claim 1, wherein the step of identifying the link quality further comprises: comparing the link quality metric received from the advertisement of the at least one neighbor with the high threshold and the low threshold.

4. The routing method according to claim 1, wherein the link quality metric is selected from at least one of: a received signal strength indicator (RSSI), a Bit Error Rate (BER), a Signal to Noise Ratio (SNR), a Signal to Noise and Interference Ratio (SNIR), and any combination thereof.

5. The routing method according to claim 1, wherein the low threshold is selected to be higher than a sensitivity of a recipient node.

6. The routing method according to claim 1, wherein the step of identifying link operationality further comprises: comparing the score with a score-operational (SOP) criterion and with a Score-Non-Operational (SNOP) criterion.

7. The routing method according to claim 1, wherein the step of identifying link operationality further comprises: identifying a link-from-neighbor operationality and a link-to-neighbor operationality.

8. The routing method according to claim 7, wherein the step of identifying the link-from-neighbor operationality comprises:
    marking the link-from-neighbor as directionally Operational (OP) when the score meets the SOP criterion;
    marking the link-from-neighbor as directionally Non-Operational (NOP) when the score meets the SNOP criterion; and
    keeping the link-from-neighbor as a previous status when the score does not meet the SOP criterion and the SNOP criterion.

9. The routing method according to claim 8, wherein the step of identifying the link-to-neighbor operationality comprises:
    marking the link-to-neighbor as directionally NOP when each node does not find each node's own IP address in the advertisement;
    marking the link-to-neighbor as Going-Non-Operational (GNOP) when the score to the at least one neighbor meets the SNOP criterion when each node finds each node's own IP address in the advertisement; and
    marking the link-to-neighbor as directionally OP when the score to the at least one neighbor does not meet the SNOP criterion when each node finds each node's own IP address in the advertisement.

10. The routing method according to claim 8, wherein the score to the at least one neighbor is calculated based on the link quality metric of an advertised last j marks.

11. The routing method according to claim 9, wherein the score to the at least one neighbor is calculated based on the link quality metric of an advertised last j−1 marks and assuming that the $j^{th}$ mark has a low-quality.

12. The routing method according to claim 7, wherein a link-with-neighbor is marked as bidirectionally OP when both link-from-neighbor and link-to-neighbor meet the OP criterion.

13. The routing method according to claim 7, further comprises: broadcasting a Route Failure Message (RFM) when a link-with-neighbor is marked as NOP.

14. The routing method according to claim 7, wherein the step of identifying link operationality further comprises: determining the link-from-neighbor operationality and the link-to-neighbor operationality under data packet transmission failure.

15. The routing method according to claim 14, wherein the step of determining the link-from-neighbor operationality and the link-to-neighbor operationality under data packet transmission failure further comprises:
  increasing a packet retransmission counter by 1 when a data packet transmission has failed;
  increasing a dropped packet counter by 1 when the data packet retransmission counter exceeds a predetermined number of retransmission tries, R; and
  marking both the link-to-neighbor and the link-from-neighbor as NOP when the dropped packet counter exceeds a predetermined number of dropped packets, N.

16. The routing method according to claim 15, further comprise: retransmitting data packet when the data packet retransmission counter is below the predetermined number of retransmission tries, R.

17. The routing method according to claim 15, further comprise: resetting the packet retransmission counter, and retransmitting data packet when the dropped packet counter is below the predetermined number of dropped packets, N.

18. The routing method according to claim 13, wherein the step of filtering route construction messages comprises responding to a Seek Route Message (SRM) from the at least one neighbor and responding to the RFM from the at least one neighbor.

19. The routing method according to claim 18, wherein responding to the SRM comprises:
  discarding the received SRM when each node receives the SRM over a NOP link-with-neighbor; and
  discarding the received SRM if the link-to-neighbor is marked as GNOP when each node receives the SRM over an OP link-with-neighbor.

20. The routing method according to claim 18, wherein responding to the RFM comprises:
  discarding the received RFM when each node receives the RFM over the NOP link-with-neighbor.

21. The routing method according to claim 18, wherein responding to the RFM comprises:
  when each node receives the RFM over an OP link-with-neighbor, marking the link-to-neighbor as NOP if the RFM has each node's own IP address among a list of non-reachable destinations; and
  invalidating the route using that link.

22. A mobile device comprising a non-transitory computer readable medium storing instructions to cause the mobile device to execute the method of claim 1.

23. A mobile ad-hoc network comprising a plurality of nodes, each node communicating with the at least one neighbor according to the routing method of claim 1.

24. A mobile ad-hoc network comprising:
  a plurality of point of attachment (PoA) forming a coverage area, each PoA configured to provide a communication link for a mobile node;
  each PoA identifying a link quality metric for the communication link with the mobile node;
  the plurality of PoA located such that:
    when the mobile node is within the coverage area, the mobile node has at least one operational link with at least one PoA of the plurality of PoA;
    when the mobile node moves within the area of coverage, the at least one operational link is degrading and the communication link with at least one other PoA is improving; and
    when the mobile node has only one operational link, a travel time for the mobile node to travel between the PoA with the operational link to the at least one other PoA is less than a time for the mobile node to mark the operational link as non-operational and select the communication link as operational;
  wherein the link quality metric comprises:
    marking a link quality as high when the link quality metric exceeds a high threshold;
    marking the link quality as low when the link quality metric falls below a low threshold;
    marking the link quality as high when the link quality metric falls below the high threshold, and before the link quality metric falls below the low threshold;
    marking the link quality as low when the link quality metric rises above the low threshold, and before the link quality metric exceeds the high threshold; and
    marking the link quality as low when a timeout timer for receiving an advertisement expires before receiving a new advertisement.

25. The mobile ad-hoc network according to claim 24, wherein the link quality metric is hysteresis-based.

26. The mobile ad-hoc network according to claim 24, each PoA compares the link quality metric received from the advertisement with the high threshold and the low threshold.

27. The mobile ad-hoc network according to claim 24, wherein the link quality metric is selected from at least one of: a received signal strength indicator (RSSI), a Bit Error Rate (BER), a Signal to Noise Ratio (SNR), a Signal to Noise and Interference Ratio (SNIR), and any combination thereof.

28. The mobile ad-hoc network according to claim 24, wherein the low threshold is selected to be higher than a sensitivity of the mobile node.

29. The mobile ad-hoc network according to claim 24, wherein the at least one operational link is identified by: comparing a score with a score-operational (SOP) criterion and with a Score-Non-Operational (SNOP) criterion.

30. The mobile ad-hoc network according to claim 24, wherein the at least one operational link is identified by: identifying a link-from-neighbor operationality and a link-to-neighbor operationality.

31. The mobile ad-hoc network according to claim 30, wherein the link-from-neighbor operationality comprises:
  marking the link-from-neighbor as directionally Operational (OP) when the score meets the SOP criterion;
  marking the link-from-neighbor as directionally Non-Operational (NOP) when the score meets the SNOP criterion; and
  keeping the link-from-neighbor as a previous status when the score does not meet the SOP criterion and the SNOP criterion.

32. The mobile ad-hoc network according to claim 31, wherein the link-to-neighbor operationality comprises:
  marking the link-to-neighbor as directionally NOP when each PoA does not find each PoA's own IP address in the advertisement;

marking the link-to-neighbor as Going-Non-Operational (GNOP) when the score to the at least one neighbor meets the SNOP criterion when each PoA finds each PoA's own IP address in the advertisement; and marking the link-to-neighbor as directionally OP when the score to the at least one neighbor does not meet the SNOP criterion when each PoA finds each PoA's own IP address in the advertisement.

\* \* \* \* \*